UNITED STATES PATENT OFFICE.

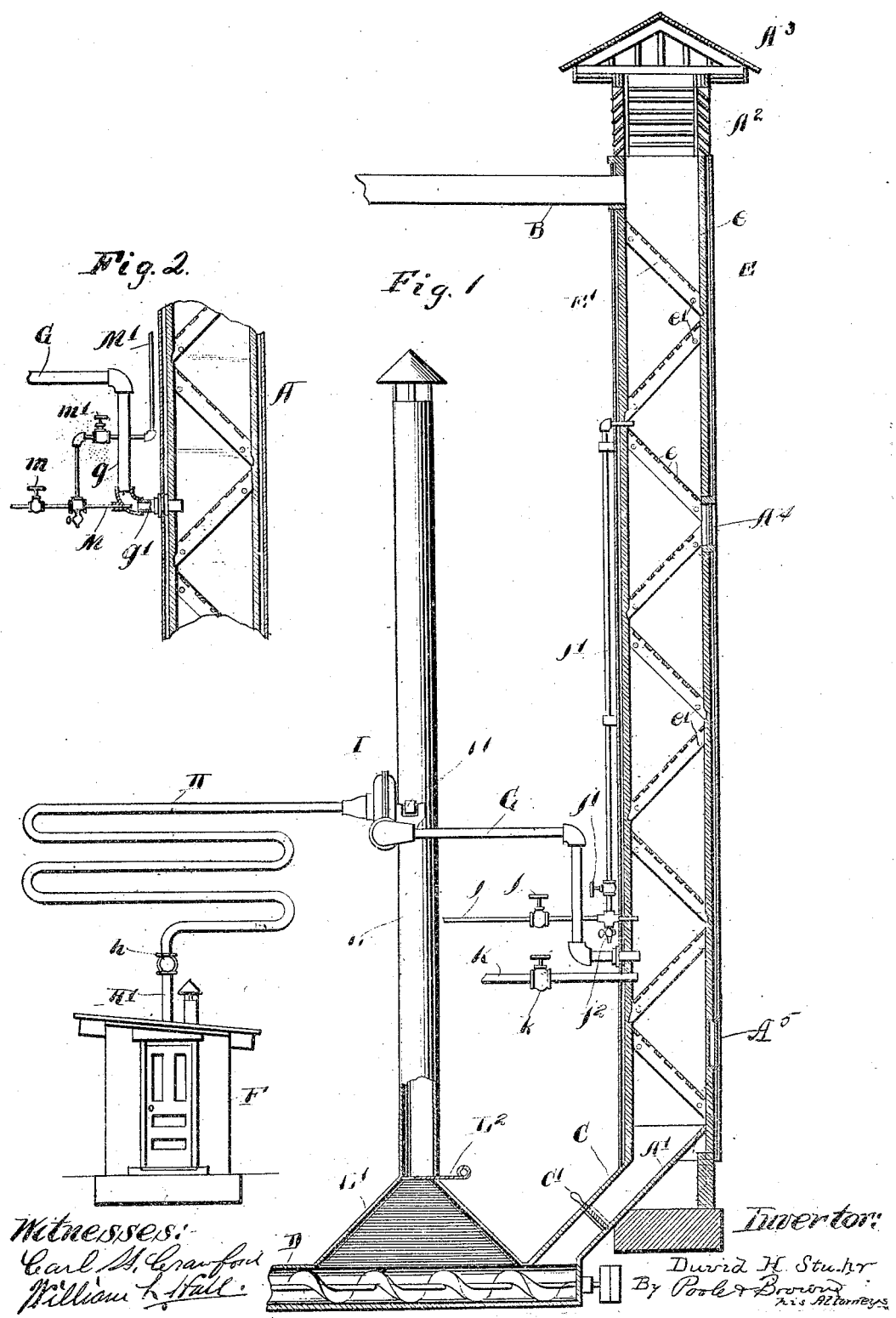

DAVID H. STUHR, OF DAVENPORT, IOWA, ASSIGNOR TO AMERICAN GRAIN PURIFIER CONSTRUCTING COMPANY, OF PIERRE, SOUTH DAKOTA, A CORPORATION OF SOUTH DAKOTA.

APPARATUS FOR PURIFYING GRAIN, &c.

No. 820,680.   Specification of Letters Patent.   Patented May 15, 1906.

Application filed August 3, 1901. Serial No. 70,735.

*To all whom it may concern:*

Be it known that I, DAVID H. STUHR, of Davenport, in the county of Scott and State of Iowa, have invented certain new and useful Improvements in Apparatus for Purifying Grains and other Products; and I do hereby declare that the following is a full, clear, and exact description thereof, reference being had to the accompanying drawings, and to the letters of reference marked thereon, which form a part of this specification.

This invention relates to an improved apparatus for purifying grains and other products by removing therefrom impurities or foreign substances clinging thereto—such as stains, mold, dust, must, smut, and bacteria—which not only lessen the market value of the product by reason of discoloration thereof, but also injure the quality of the product, and which bacteria tends to destroy the germinating quality of the grain.

The apparatus herein shown has been devised for the purpose of purifying grain—such as barley, oats, and the like; but the improvements constituting my invention may be embodied in apparatus for purifying or cleaning other products.

The invention is intended for carrying out a process of purifying grains which consists generally in passing the product to be purified through a suitable chamber and introducing to said chamber during the progress of the grain therethrough a purifying and dampening agent, said purifying agent consisting, preferably, of a sulfur or sulfur compound, and the dampening agent consists, preferably, of steam. The steam acts upon the product to loosen the investing coating of the foreign substances thereon, and the fumes thereafter attack the loosened vesture, carry away the objectionable foreign substances, and leave the product in a cleanly and sweetened condition.

My present invention relates to an improved construction in means for introducing to the purifying-chamber separately from each other a dampening agent and purifying fumes, whereby the product to be purified may be dampened before the same is acted upon by the fumes, in means for independently regulating the supply of the dampening agent and of the fumes, and means for preventing the escape of the fumes at or near the working level of the apparatus.

The invention consists in the matters hereinafter set forth, and more particularly pointed out in the appended claims.

In the drawings, Figure 1 is a view, partly in vertical section and partly in elevation, of an apparatus embodying my improvements. Fig. 2 is a vertical section of a fragment of the purifying-chamber, showing another form of means for introducing the fumes to the chamber.

As shown in said drawings, and referring more particularly to Fig. 1, A designates a vertically-elongated chamber having the appearance of a shaft and through which grain is adapted to pass from the upper to the lower end thereof. Said chamber is made of considerable height, it being from thirty to forty feet, depending upon the conditions in each instance.

At the upper end of the chamber is a conveyer, shell, or spout B, which is adapted to lead from an elevator or other like place (not shown) and through which grain is delivered to the chamber. Said chamber is provided with an outlet chute or spout C, which latter communicates with the shell of a discharge-conveyer D, said discharge-conveyer leading to any suitable place for the disposal of the grain. Said discharge chute or spout C is provided with a valve or gate C', by which the passage of grain therethrough is regulated. The chamber A is constructed at its upper end to provide a ventilator A', through which the fumes and steam may escape, and is provided above said ventilator with an overhanging roof $A^3$. Said chamber is provided interiorly thereof with means for retarding the descent of the grain therethrough, whereby the body of the grain in its passage or descent through the chamber is broken up and intimately exposed to the action of the fumes. Said retarding means consists of a plurality of inclined shelves arranged one above the other and inclined alternately in opposite directions at angles of about forty-five degrees, as herein shown.

Said shelves are made of open-work construction, permitting the grain to pass downwardly therethrough, and consist of inclined bars E', affixed to the side walls of the chamber, and transverse slats e, fitting at the ends thereof in upwardly-opening notches or recesses in the upper faces or margins of said bars.

The end bars of the shelves are fastened to the side walls of the chamber by wooden pins passed therethrough and into said walls and by tenons at the ends of said bars which engage mortises in said walls, it being undesirable to use other fastening devices for this purpose because of the deteriorating action of the sulfur fumes thereon. The chamber is provided at one side thereof with a door $A^4$, which permits access to the chamber for cleaning the same or other purposes. It is desirable that the gate or valve C' be so regulated with respect to the inlet of the grain as to fill the bottom of the chamber with a body of grain of a height of five or six feet to prevent the fumes escaping into the discharge-conveyer. An inspecting-window $A^5$ will also desirably be built in the wall of the chamber, near the base thereof, in order to readily determine the level of the grain in the chamber, whereby said level may by the use of the valve C' be uniformly maintained.

The furnace, which is designated as a whole by F, for generating the fumes may be made of any character or construction desired. Said furnace is connected with the purifying-chamber by means of a pipe or passage connected with or embodying means for cooling the fumes prior to their entrance to the purifying-chamber and provided with means for positively carrying said fumes from the furnace to the chamber.

As herein shown, G designates a pipe by which the fumes are conducted to the purifying-chamber. Said pipe communicates at one end with the purifying-chamber near the lower end thereof and at its other end with a cooling-coil H, which latter is connected by a pipe H' with the furnace, said pipe H' being provided with a regulating-valve $h$. The pipe G is connected with the cooling-pipe H through the medium of an exhaust-fan I, said fan receiving the fumes from the cooling-pipe H and delivering the same through the pipe G to the purifying-chamber. The said exhaust-fan is provided with the usual driving-wheel I', which is driven from any suitable source of power. (Not shown.) The cooling-pipe H is shown as having the form of a coil and is made of considerable length, whereby the fumes passing therethrough on their way from the furnace to the purifying-chamber give up a large amount of their heat and enter the purifying-chamber at a relatively low temperature.

J designates a steam-pipe through which the dampening agent, which in the present instance is steam, is conducted to the purifying-chamber. Said pipe delivers the steam to said chamber independently of the delivery of the fumes thereto and enters the chamber a short distance above the entering end of the fumes-pipe G. The steam-pipe J is provided with a branch pipe J', which is carried upwardly and enters the purifying-chamber at a point near the upper end of the chamber. Said pipes J J' are provided with controlling-valves $j\ j'$, whereby the supply of steam to the chamber may be regulated to correspond with the condition of the grain or other product being purified. The pipe J is provided with a drip-cock $j^2$ to permit water of condensation to escape therefrom. The pipes J J', as herein shown, deliver live steam to the purifying-chamber. In addition to delivery of live steam through the pipes J J' to the purifying-chamber I have provided means for supplying to the chamber exhaust-steam from one or more of the engines used about the elevator plant, said exhaust-steam being introduced to the purifying-chamber through a pipe K, which is shown as entering the chamber a short distance below the fumes-pipe G. Said exhaust-steam pipe is provided with a regulating-valve $k$.

Notwithstanding the solid body of grain in the lower end of the purifying-shaft, as before stated, traces of the fumes are likely to escape therethrough and into the conveyer D, and I have shown means for preventing the escape of said fumes at or near the level of the base of the chamber A and for discharging the same a distance above said level. The means for this purpose consists, in this instance, of a ventilator-stack L, which is provided at its lower end with a flat flaring portion L', fitting over an opening in the top of the shell of the conveyer D and connected at its margin with said shell by means affording gas-tight connections. Said stack is extended upwardly a sufficient distance to carry what fumes may escape into the conveyer D a height at which the discharge thereof will be unobjectionable, the height of said stack depending upon the location of the surrounding buildings and other conditions. Said stack is provided at the apex of the flaring portion with a valve or gate $L^2$, by which the current of gases through said stack may be regulated, it being necessary to limit the passage of the gases therethrough, as the full capacity of the stack would tend to create a downward current of the fumes in the purifying-chamber.

In the operation of the apparatus described sulfur or other purifying agent is ignited in the furnace and the fumes thereof pass from the furnace through the cooling-pipe H and the pipe G to the purifying-chamber, said fumes being drawn or forced through said pipe by the action of the exhaust-fan I. The steam is delivered to the purifying-chamber through either of the pipes J, J', or K or all of said pipes, as conditions may require, and delivery of the fumes to the purifying-chamber not depending on the steam the quantity of steam delivered to the chamber may be varied without varying the quantity of fumes delivered thereto.

By reason of the fact that air for supporting combustion is admitted freely to the furnace and the exhaust-fan I operates to produce a strong draft through the furnace it follows that a considerable quantity of air will be drawn from the furnace with the fumes and will be delivered to the purifying-chamber. The said exhaust-fan therefore constitutes a means for delivering to the purifying-chamber an admixture of air and fumes.

The provision of the cooling-pipe H in connection with the exhaust-fan I, by which the fumes are positively delivered from the furnace to the purifying-chamber, is of considerable practical importance, for the reason that with the proper length of the cooling-pipe I am enabled to deliver the fumes to the chamber at substantially atmospheric temperature. As a result of this operation the heat of the fumes does not tend to drive off the moisture from the steam entering the chamber nor does it tend to drive off the moisture from the grain, as would be true if the fumes were permitted to enter the chamber at the original temperature of generation thereof. It is essential to the proper purification of grain by the process mentioned that a certain percentage of moisture be added to the grain after its introduction to the purifying apparatus, (the amount depending upon the condition of the grain and the quantity of moisture carried thereby when introduced to the apparatus,) as if the proper moistened condition of the grain be not maintained the fumes will have little or no effect toward removing the foreign substances therefrom. With my construction, therefore, the efficiency of the fumes to purify the grain is greatly increased over a process wherein the fumes are introduced to the purifying-chamber at practically their maximum temperature. Moreover, by the use of the exhaust-fan and the regulating-valve h in the pipe H', I am enabled to vary the quantity of fumes delivered to the purifying-chamber to correspond with the requirements for each batch of grain passed through the apparatus, being enabled to deliver as small or as large a quantity of the fumes between the minimum and maximum limits thereof as is required.

The construction whereby the steam is delivered to the purifying-chamber independently of the fumes is of considerable practical importance, for the reason that grains delivered to the chamber at different times contain varying quantities of moisture, and it is obvious that a batch of grain containing a given percentage of moisture will require a less quantity of the dampening agent to properly prepare the same for action thereon by the fumes than another batch which is relatively drier. If the quantity of the dampening agent delivered to the purifying-chamber be non-varying with respect to the quantity of fumes delivered thereto, there will be no means of regulating the supply of said dampening agent to correspond with the amount of moisture carried by the grain when introduced into the apparatus, and a batch of grain, therefore, having a considerable quantity of moisture must be treated to the same amount of dampening agent as grain having a less quantity of initial moisture therein. With my construction, on the other hand, I am enabled to vary the quantity of the dampening agent introduced to the purifying-chamber and am therefore enabled to uniformly moisten all conditions of grain which passes through the apparatus, so that the action of the fumes thereon will be uniform. As a result of the construction described the purified product may be maintained substantially uniform notwithstanding the varying conditions of the grain when delivered to the apparatus.

The introduction of steam through the pipe J' to the purifying-chamber near the upper end thereof or near the introduction of the grain to said chamber is of considerable importance, as it enables the application of the dampening agent to the grain for a considerable time in advance of the most effective action of the fumes thereon. Moreover, the delivery of exhaust-steam to the chamber is an important feature of the operation herein described, for the reason that said exhaust-steam contains a greater quantity of moisture than the live steam, and I am enabled by the use of said exhaust-steam to insure the proper moistening of the grain, notwithstanding its condition upon entering the apparatus. For different conditions of grains different quantities of live and exhaust steam will be employed to produce the best results, the controlling-valves of the steam-pipes permitting such regulation.

So far as is concerned the introduction of the dampening agent near the top or inlet end of the purifying-chamber and the cooling of the said fumes before their introduction into said chamber I may employ a portion of the steam for drawing the fumes into said chamber in the manner shown in Fig. 2. As shown in said figure, M designates the steam-pipe through which steam is delivered to the purifying-chamber, and said steam-pipe is made to enter the fumes-pipe G at or near the entrance of said fumes-pipe to the chamber and acts in the manner of an injector to create a current of the fumes toward the purifying-chamber. As herein shown, said fumes-pipe is provided with a short vertical portion g and a short horizontal portion g', which latter enters the chamber, and the steam-pipe M enters the pipe g' at the intersection thereof with the vertical pipe g. Said steam-pipe is provided with a branch M', which is adapted to extend near the top of the chamber in the manner of the pipe J' (shown in Fig. 1) and to enter the chamber at or near the top thereof. Said pipes M M' are provided with regulating-valves m m'.

It is obvious that many changes may be made in the details of the apparatus without departing from the spirit of my invention, and I do not wish to be limited thereto except as hereinafter made the subject of specific claims. Furthermore, the various parts of the apparatus may be used in connection with or separate from other parts thereof, and certain of the claims have been drawn to cover the separate parts without limitation to the combination in which they are herein shown.

I claim as my invention—

1. An apparatus for the purpose set forth, comprising a vertically-elongated purifying-chamber which is closed at its bottom and open at its top, means for continuously supplying grain to the top, and withdrawing it from the bottom, of said chamber, means for supplying sulfur fumes to the lower part of said chamber and means for supplying a dampening agent to the said chamber near the top or receiving end thereof, whereby the grain entering the chamber is subjected to the action of the dampening agent before the said grain reaches the part of the chamber in which it is more directly acted upon by the sulfur fumes.

2. An apparatus for the purpose set forth, comprising a vertically-elongated purifying-chamber, means for continuously supplying grain to the top, and withdrawing it from the bottom, of said chamber, means for supplying sulfur fumes to the lower part of said chamber, means for supplying a dampening agent to the said chamber near the top or receiving end thereof and means for separately controlling the supply of the sulfur fumes and of the dampening agent to said chamber.

3. An apparatus for the purpose set forth comprising a vertically-elongated purifying-chamber, means for continuously supplying grain to the upper part and withdrawing it from the bottom of said chamber, a furnace for generating sulfur fumes connected with the lower part of said chamber by a passage, means in said passage for withdrawing the fumes from the furnace and forcing them into the chamber and a valved steam-supply pipe discharging into the chamber between the outlet end of said passage and the upper part of the chamber.

4. An apparatus for the purpose set forth comprising a vertically-elongated purifying-chamber, means for continuously supplying grain to the top and withdrawing it from the bottom of said chamber, a furnace for generating sulfur fumes and connected with the lower part of said chamber by a passage, means in said passage for withdrawing the fumes from said furnace and forcing them into the chamber, a cooling-pipe forming part of said passage, means for introducing a dampening agent into said chamber between said passage and the upper part of the chamber and means for separately controlling the supply of the sulfur fumes and of the dampening agent to said chamber.

5. An apparatus for the purpose set forth, comprising a vertically-elongated purifying-chamber, means for continuously supplying grain to the upper and withdrawing it from the lower part of the chamber, a furnace for generating sulfur fumes, connected with the purifying-chamber by a passage, means in said passage for withdrawing fumes from the furnace and forcing them into the chamber and means for moistening or dampening the grain before it is acted upon by the fumes entering the chamber.

6. An apparatus for the purpose set forth comprising a purifying-chamber, means for continuously delivering the product to be purified to, and withdrawing it from said chamber, means for introducing a dampening agent into said chamber to moisten the product, a furnace for generating sulfur fumes, means for cooling the fumes, and means for conducting the cooled fumes to the said chamber.

7. An apparatus for the purpose set forth comprising a chamber through which the products to be purified are passed, and provided at its upper end with an inlet and at its lower end with an outlet, a conveyer communicating with said outlet, means for delivering the purifying fumes to said chamber, means for dampening the product preparatory to the action thereon by the fumes and means for withdrawing the fumes which escape from the purifying-chamber to the conveyer and discharging the same at a point above the level of the base of the apparatus.

8. An apparatus for the purpose set forth comprising a chamber through which the product to be purified is passed and provided at its upper end with an inlet and at its lower end with an outlet, a conveyer communicating with said outlet, means for delivering the purifying fumes to said chamber, means for dampening the product preparatory to the action thereon by the fumes, and a ventilating-stack communicating at its lower end with the interior of said conveyer for carrying the fumes from said conveyer which escape from the purifying-chamber, said stack being made of considerable height and provided with a regulating-valve.

In testimony that I claim the foregoing as my invention I affix my signature, in presence of two witnesses, this 26th day of July, A. D. 1901.

DAVID H. STUHR.

Witnesses:
WILLIAM L. HALL,
GEORGE R. WILKINS.